United States Patent
Huang et al.

(10) Patent No.: US 7,957,821 B2
(45) Date of Patent: Jun. 7, 2011

(54) SYSTEMS AND METHODS FOR STATISTICAL PROCESS CONTROL

(75) Inventors: Ming-Chang Huang, Hsinchu Hsien (TW); Ming-Fa Chen, Hsinchu Hsien (TW)

(73) Assignee: Taiwan Semiconductor Manufacturing Co., Ltd., Hsin-chu (TW)

( * ) Notice: Subject to any disclaimer, the term of this patent is extended or adjusted under 35 U.S.C. 154(b) by 1904 days.

(21) Appl. No.: 10/989,494

(22) Filed: Nov. 17, 2004

(65) Prior Publication Data

US 2006/0106469 A1    May 18, 2006

(51) Int. Cl.
G05B 13/02    (2006.01)
G05B 9/02    (2006.01)
G06F 19/00    (2006.01)
G01N 37/00    (2006.01)

(52) U.S. Cl. ............... 700/33; 700/32; 700/80; 700/81; 700/82; 70/82; 70/84

(58) Field of Classification Search .............. 700/32–33, 700/80–82, 109–110, 121; 702/84, 82
See application file for complete search history.

(56) References Cited

U.S. PATENT DOCUMENTS

| | | | | |
|---|---|---|---|---|
| 5,225,998 A * | 7/1993 | Singhal | ............. | 702/84 |
| 5,841,676 A * | 11/1998 | Ali et al. | ............. | 702/84 |
| 5,937,364 A * | 8/1999 | Westgard et al. | ............. | 702/83 |
| 5,987,398 A * | 11/1999 | Halverson et al. | ............. | 702/179 |
| 6,424,876 B1 * | 7/2002 | Cusson et al. | ............. | 700/108 |
| 2003/0014205 A1 * | 1/2003 | Tabor | ............. | 702/84 |
| 2003/0164762 A1 * | 9/2003 | Ridley | ............. | 340/521 |
| 2005/0038543 A1 * | 2/2005 | Lin et al. | ............. | 700/108 |

FOREIGN PATENT DOCUMENTS

| | | |
|---|---|---|
| CN | 1658367 A | 8/2005 |
| TW | 495700 | 7/2002 |
| TW | 518645 | 1/2003 |
| TW | 559974 | 11/2003 |

* cited by examiner

*Primary Examiner* — Ronald D Hartman, Jr.
(74) *Attorney, Agent, or Firm* — Birch, Stewart, Kolasch & Birch, LLP

(57) ABSTRACT

A system for performing statistical process control. A storage device stores a plurality of SPC charts, specifying data collected from a system during testing. A controller categorizes the SPC charts into a plurality of groups based on characteristics thereof. A detector determines whether the charts in any of the groups violate a preset rule. An alarm generator generates alarm information identifying the chart violating the rule.

15 Claims, 5 Drawing Sheets

| Name | Target | Specification limit | Last data point | Measures | | | | | | | Preset | | | | | | |
|---|---|---|---|---|---|---|---|---|---|---|---|---|---|---|---|---|---|
| | | | | Long term | | | Short term | | | Long term | | | Short term | | |
| | | | | Cp | Cpk | K | Cp | Cpk | K | Cp | Cpk | K | Cp | Cpk | K |
| C1 | 0 | 0.4 | OK | 1.09 | 0.99 | 0.09 | 3.77 | 3.3 | 0.13 | 0.7 | 0.8 | 0.5 | 0.7 | 0.5 | 0.4 |
| C2 | 0 | 0.4 | CPK low | 0.85 | 0.76 | 0.11 | 0.82 | 0.53 | 0.35 | 0.7 | 0.8 | 0.5 | 0.7 | 0.5 | 0.4 |
| C3 | 0 | 0.4 | Trend down | 0.94 | 0.87 | 0.07 | 1.07 | 0.91 | 0.42 | 0.7 | 0.8 | 0.5 | 0.7 | 0.5 | 0.4 |

FIG. 4

SYSTEMS AND METHODS FOR STATISTICAL PROCESS CONTROL

BACKGROUND

The invention relates generally to process control, and more particularly to data collection and statistical process control in a manufacturing environment.

Commercially available manufacturing execution system (MES) packages are used throughout semiconductor manufacturing sectors. The statistical process control (SPC) system employed by these commercially available packages, however, frequently operates under incorrect parameters. For example, a typical SPC system operates on an entity and/or lot base, while a typical factory operates on a chamber and/or wafer base. Additionally, these SPC systems are difficult to maintain and require large amounts of statistical process control charts (over 14,000 for a typical fab operation) to achieve effective process monitoring. A statistical process control chart is typically generated by a labor-intensive process.

Particular solutions offered by various vendors for specific applications do not take into account integration arising from different databases and manufacturing systems. Therefore, these solutions cannot adequately address the disadvantages of the described SPC systems. As a result, separate solutions may give rise to communication problems.

Various conventional SPC rules have been developed to assist operators in determining whether machines or processes are not operating properly, or have become "out of control". The rules are designed to look for patterns in response variables observed from the machine or process. The SPC rules determine if the machine or process is out of control. Generally, these SPC rules are set under the assumption that data are "normally distributed". These SPC rules are very simple to use, but provide inadequate assistance in managing large quantities of SPC charts.

SUMMARY

In embodiments of a system for performing statistical process control, comprising a storage device, controller, detector, and alarm generator, the storage device stores a plurality of SPC charts, each of which corresponds to data collected from a system during testing. The controller categorizes the SPC charts into a plurality of groups based on characteristics thereof. The detector determines whether the charts in any one of the groups violate a preset rule. The alarm generator generates alarm information specifying the chart violating the rule.

In a method of statistical process control (SPC), a plurality of SPC charts are provided, specifying data collected from a system during testing. The SPC charts are categorized into a plurality of groups based on characteristics thereof. It is determined whether the charts within a particular group violate a preset rule. Alarm information is generated specifying the charts violating the rule.

The method may take the form of program code embodied in a tangible media. When the program code is loaded into and executed by a machine, the machine becomes an apparatus for practicing the method.

DESCRIPTION OF THE DRAWINGS

The invention can be more fully understood by reading the subsequent detailed description and examples with references made to the accompanying drawings, wherein:

FIG. 4 shows information for rule checking in an embodiment of statistical process control (SPC) method.

DETAILED DESCRIPTION

Exemplary embodiments of the invention will now be described with reference to FIGS. 1 through 5, which generally relate to statistical process control (SPC) in a manufacturing environment. While some embodiments of the invention are applied with semiconductor manufacturing, it is understood that the product processed by the manufacturing system is not critical, and other manufacturing system involving various control charts may be readily substituted.

In the following detailed description, reference is made to the accompanying drawings which form a part hereof, and in which is shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the Figures corresponds to the Figure number, with the exception that the same reference number is used throughout to refer to an identical component which appears in multiple Figures.

Figure 1:
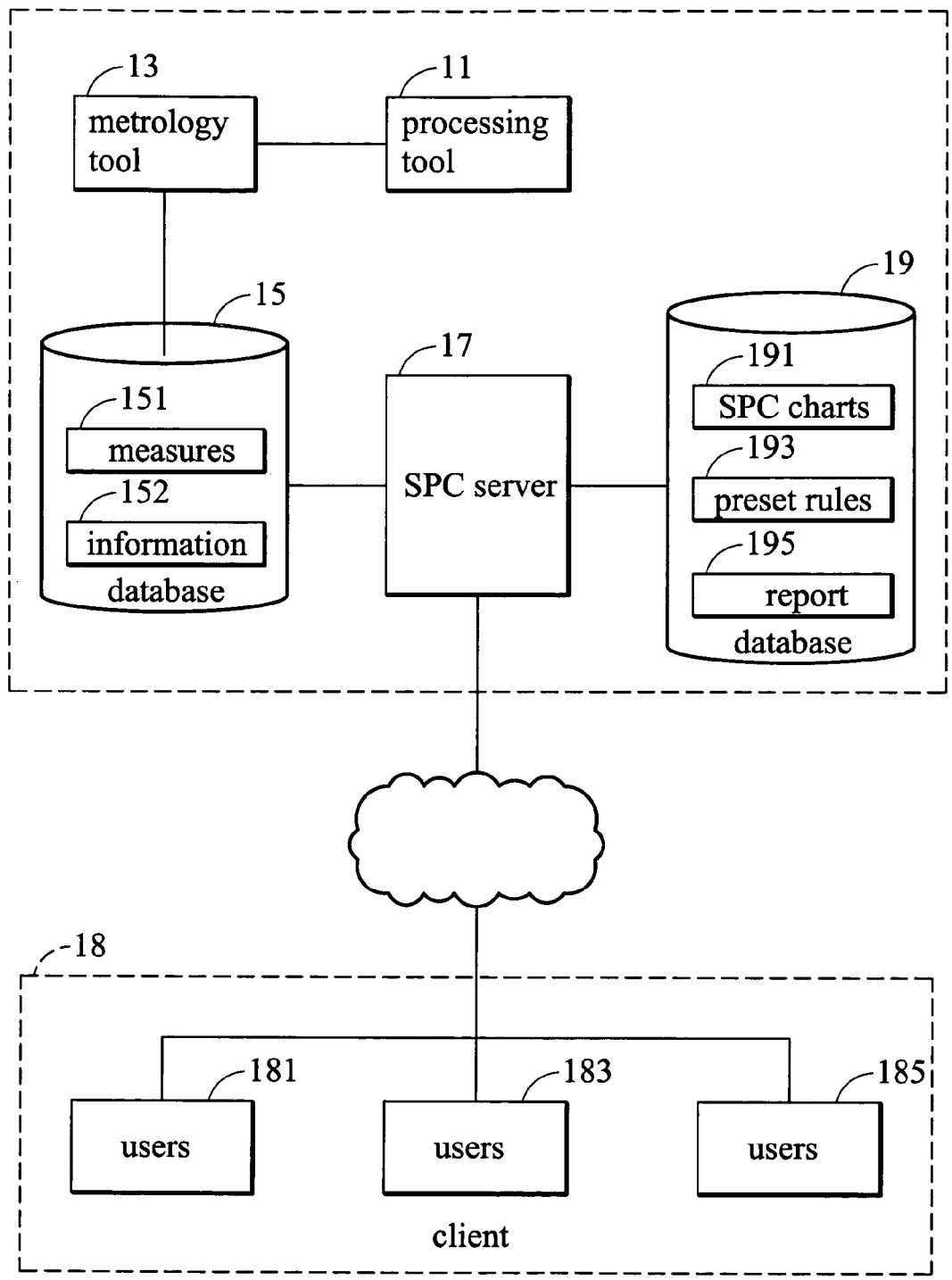
FIG. 1 is a schematic view of an embodiment of a manufacturing system implementing statistical process control (SPC)

FIG. 1 is a schematic view of an embodiment of a manufacturing system implementing statistical process control (SPC). Specifically, a processing tool 11 is operative to process wafers. A metrology tool 13 measures characteristics of wafers processed by tool 11. The characteristics comprise thickness of a film laid on the wafer, overlay error, and other characteristics pertaining to wafer processing and quality. The measurement can be performed online or offline. The measurements 151 are stored in a database 15. The database 15 also stores information 152 pertaining to operating status of the processing tool 11. A statistical process control (SPC) server 17, connected to database 15, retrieves the measurements 151 and information 152 from database 15, and converts the measurements 151 and information 152 to SPC charts 191. The SPC charts 191 can be stored in a SPC database 19. The SPC server 17 can process different types of measure obtained from a plurality of metrology tools. The SPC charts 191 are further categorized into a plurality of groups based on characteristics thereof. SPC charts within one of the groups are processed by SPC server 17 according to preset rules 193 to generate a report 195. The report 195 identifies the SPC chart violating the preset rules 193. The report 195 may be transmitted to client 18 through network 16. Client 18 comprises computer devices for users 181, 183, and 185. Network 16 can be an intranet or Internet.

Figure 2:
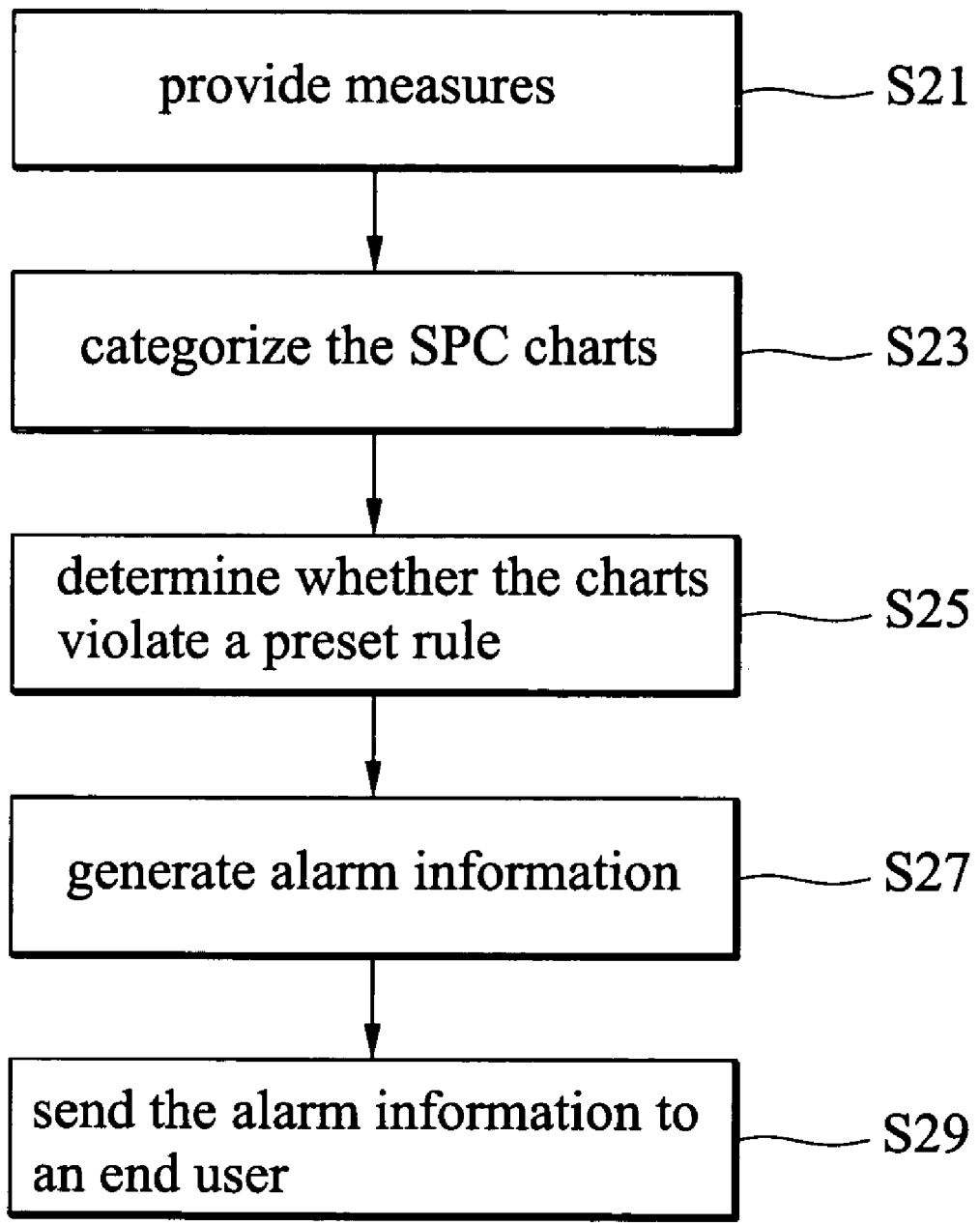
FIG. 2 is a flowchart of an embodiment of a statistical process control (SPC) method.

The processing algorithm implemented in SPC server 17 is detailed in the flowchart of FIG. 2. Measurements stored in database 15 are first retrieved for generating SPC charts (step S21). The SPC charts are categorized into a plurality of groups based on characteristics thereof (step S23). The SPC charts can be further processed when necessary. It is determined whether the charts of a particular group violate a preset rule (step S25). When a SPC chart violates the preset rule, alarm information is generated identifying the chart violating the rule (step S27). The alarm information is sent to a user through e-mail or other methods (step S29). The alarm information can be presented as an alarm report or other type of documents.

The preset rule is designed to meet special requirements, and differs with groups of SPC charts, defined using a manufacturing constant and/or a statistical parameter, or a combination thereof. Data in a SPC chart can be further processed before rule checking. For example, data in a SPC chart can be differentiated, integrated, or filtered to generate another type of chart. The rule checking focuses on an indicator variable of the SPC chart. The indicator variable can be derived from the latest data entry in the chart, a preset number of data entries, and/or data entries collected within a preset time period.

Figure 3A:
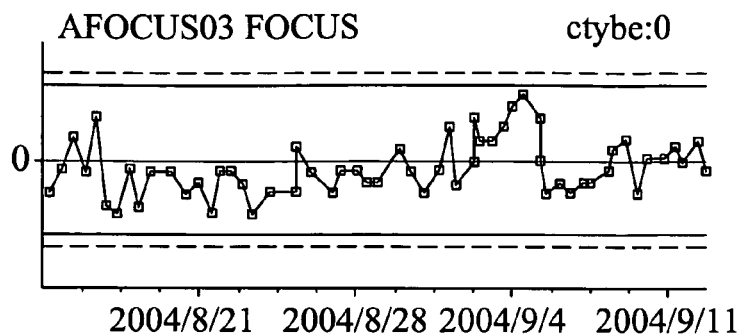
FIGS. 3a~3e show SPC charts processed in an embodiment of statistical process control (SPC) method.
Figure 3B:
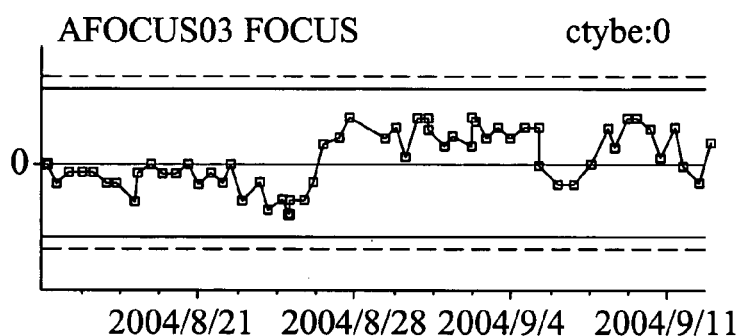
Figure 3C:
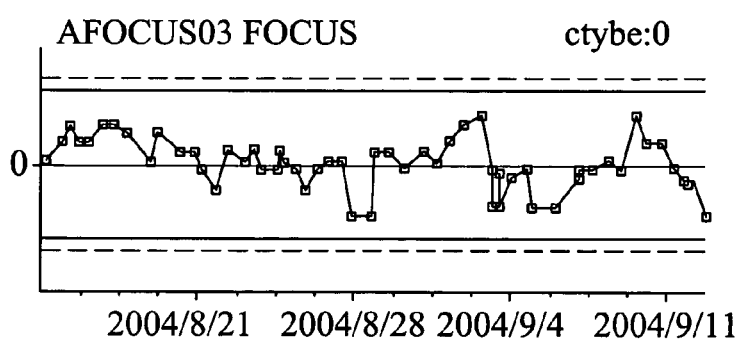
Figure 3D:
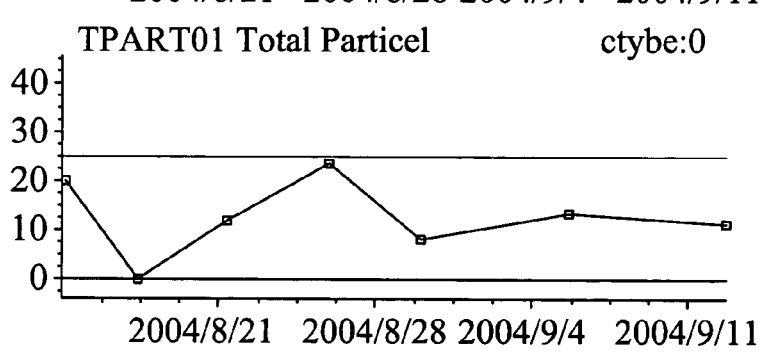
Figure 3E:
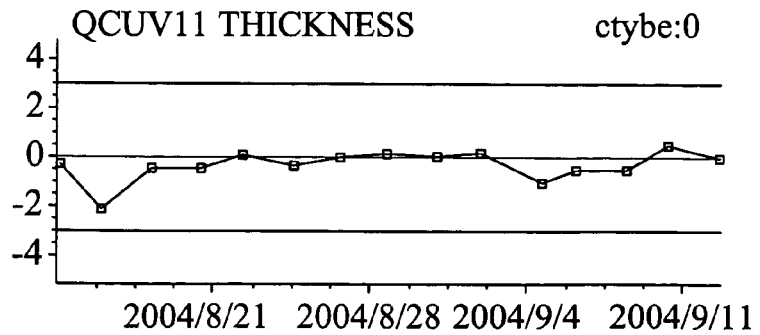

FIGS. 3a~3e show SPC charts processed in embodiments of a statistical process control (SPC) method. As shown in FIGS. 3a~3e, five SPC charts derived from different data sources are provided. FIGS. 3a~3c comprise data obtained from different stepper focus monitors, respectively. FIGS. 3d~3e comprise data obtained from an offline particle monitor and a thickness calibration monitor, respectively. SPC charts with similar characteristics are categorized into the same group. Here, FIGS. 3a~3e are categorized into the same group due to their similar data sources.

A plurality of preset rules are provided for detecting, in FIGS. 3a~3e, the presence of abnormal data. These rules are defined by at least one manufacturing constant and/or statistical parameter. The manufacturing constant may be a manufacturing target, an upper specification limit, a lower specification limit, or other pertinent constant. The statistical parameter may be Cp, K, Cpk, or other statistical parameter specifying manufacturing capability, wherein:

$$\text{standard deviation } (s) = \sqrt{\frac{\sum_i (y_i - \overline{y})^2}{n-1}}$$

$$Cp = \frac{USL - LSL}{6s}$$

$$K = \frac{|\overline{y} - T|}{(USL - LSL)/2}$$

$$Cpk = (1 - k) \times Cp.$$

The "USL" stands for "upper specification limit", and "LSL" stands for "lower specification limit".

The statistical parameters are shown in FIG. 4. An indicator variable of the chart is identified in the rule as a detection target. The indicator variable may focus on data entries of different time scale. For example, the indicator variable may be derived from the latest data entry in the chart, a preset number of data entries, or data entries collected within a preset time period. The indicator variable may be a calculated result derived from the described data entries through different calculations, such as difference, standard deviation, Cp, K, Cpk, and other statistical calculations.

Rules are established for inspection of data within long and short periods of time, respectively. For example, two rules are set for inspection of data entries within three weeks (hereinafter referred to as "long term"), and another two rules are set for inspection of data entries within three days (hereinafter referred to as "short term"). Referring to FIG. 3, the long term rules are used to inspect data entries dated between August 21~September 11. The short term rules are used to inspect data entries dated between September 12~September 14 (the results are shown in FIG. 4). And Cp, Cpk, and K of the data entries within this time period are calculated (the results are shown in FIG. 4).

One long term rule specifies that when a long term Cp calculated from the data entries is lower than the preset long term Cp, the chart is diagnosed as "long term Cp low", specifying that the corresponding manufacturing process may have a problem in capability precision. Another long term rule specifies that when a long term Cpk calculated from the data entries is lower than the preset long term Cpk, the chart is diagnosed as "long term Cpk low", specifying that the corresponding manufacturing process may have a problem in process stability.

One short term rule specifies that when a short term K calculated from the data entries is lower than the preset short term K, and a short term Cp is lower than the preset short Cp, the chart is diagnosed as "base line change", otherwise it is further determined whether the last data entry in the chart exceeds a preset target. When the last data entry in the chart exceeds a preset target, the chart is diagnosed as "trend up". When the last data entry in the chart is lower then a preset target, the chart is diagnosed as "trend down".

Referring to FIG. 4, the chart 31 passes the examination, while the charts 32 and 33 are diagnosed as "Cpk low" and "trend down", respectively.

Various embodiments, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. Some embodiments may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing embodiments of the invention. When implemented on a general-purpose processor, the program code combines with the processor to provide a unique apparatus that operates analogously to specific logic circuits.

Figure 5:
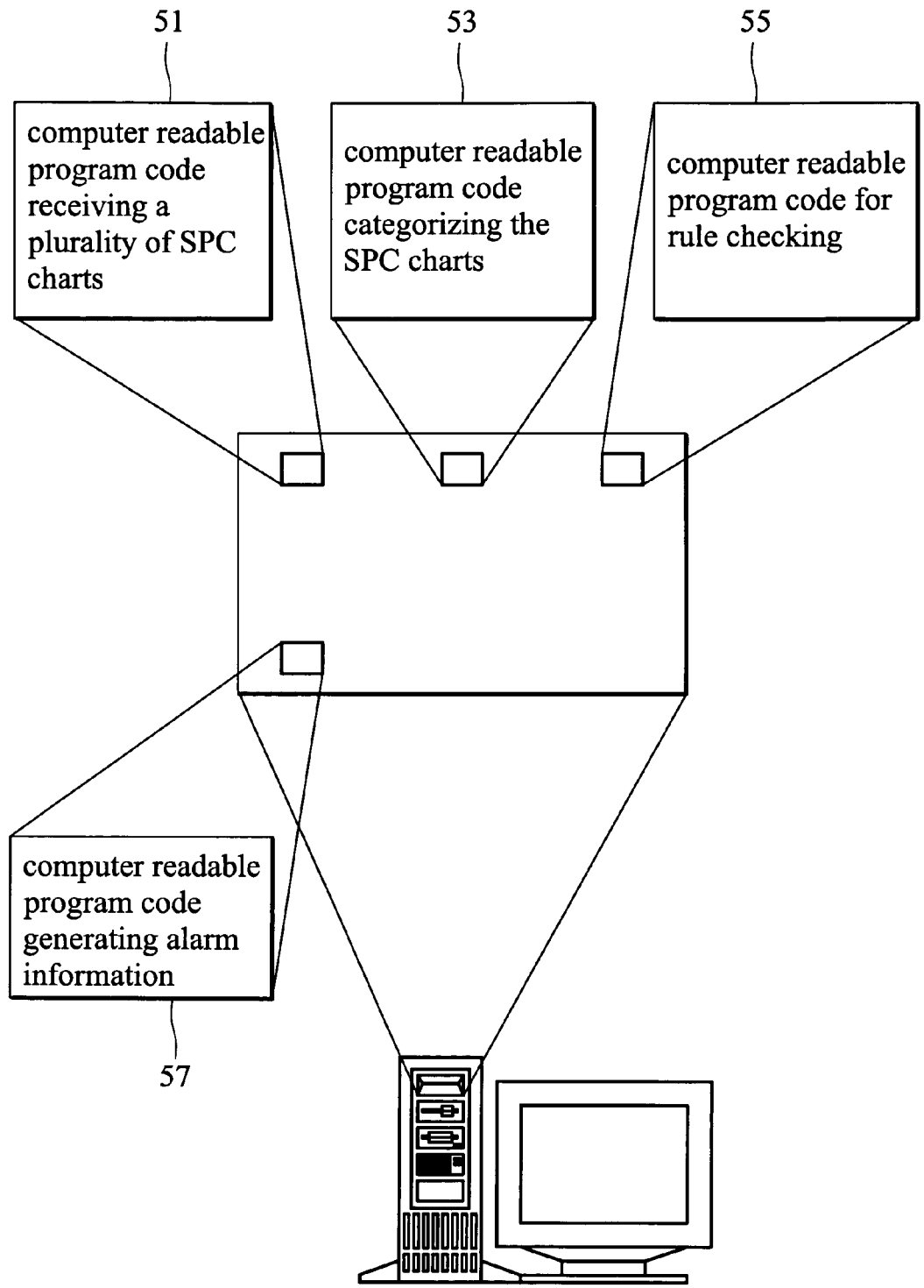
FIG. 5 shows storage medium storing a computer program providing an embodiment of a statistical process control method.

FIG. 5 is a diagram of a system that includes a storage medium storing a computer program for implementing an embodiment of a statistical process control method. The system comprises a computer-usable storage medium having computer-readable program code embodied therein. Specifically, the code comprises computer-readable program code 51 receiving a plurality of SPC charts, computer-readable program code 53 categorizing the SPC charts, computer-readable program code 55 determining whether the chart within one of the group violates a preset rule, and computer-readable program code 57 generating alarm information specifying the chart violating the rule.

While the invention has been described by way of example and in terms of several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for statistical process control, comprising:
a storage device storing a plurality of SPC charts, specifying data collected from a system during testing;
a controller categorizing the SPC charts to a plurality of groups based on characteristics thereof; and
a detector determining whether the charts within one of the groups violate a preset rule,
wherein the rule identifies an indicator variable of a chart within one of the groups as a detection target, and the indicator variable is derived from the latest data entry in the chart, a preset number of data entries or data entries collected within a preset time period.

2. The system of claim 1, wherein the rule specifies a threshold of a manufacturing constant selected from a manufacturing target and a specification limit.

3. The system of claim 2, wherein the specification limit comprises at least one of the following: an upper specification limit and a lower specification limit.

4. The system of claim 1, wherein the rule specifies a threshold of a statistical parameter of Cp, K, or Cpk.

5. The system of claim 1, further comprising an alarm generator generating alarm information identifying charts violating the rule.

6. The system of claim 5, wherein the alarm generator transmits the alarm information through a network.

7. A computer-implemented method of statistical process control (SPC), comprising:
receiving, using a computer, a plurality of SPC charts, specifying data collected from a system during testing;
categorizing, using the computer, the SPC charts into a plurality of groups based on characteristics thereof;
determining, using the computer, whether the charts within one of the group violate a preset rule;
identifying an indicator variable of a chart within one of the groups as a detection target; and
identifying the indicator variable using the latest data entry in the chart, a preset number of data entries or data entries collected within a preset time period.

8. The method of claim 7, further comprising defining the rule using a manufacturing constant, wherein the manufacturing constant is a manufacturing target, upper specification limit, or lower specification limit.

9. The method of claim 7, further comprising defining the rule using a statistical parameter of Cp, K, or Cpk.

10. The method of claim 7, further comprising generating alarm information identifying a chart within one of the groups violating the rule.

11. The method of claim 10, further comprising transmitting the alarm information through a network.

12. A computer readable storage medium storing a computer program providing a method of statistical process control (SPC), comprising:
receiving a plurality of SPC charts, specifying data collected from a system during testing;
categorizing the SPC charts into a plurality of groups based on characteristics thereof; and
determining whether the chart in any of the group violates a preset rule,
wherein the rule identifies an indicator variable of the chart as a detection target, and the indicator variable is derived from the latest data entry in the chart, preset number of data entries, or data entries collected within a preset time period.

13. The storage medium of claim 12, wherein the method further comprises defining the rule using a manufacturing constant, wherein the manufacturing constant is a manufacturing target, upper specification limit, or lower specification limit.

14. The storage medium of claim 12, wherein the method further comprises defining the rule using a statistical parameter of Cp, K, or Cpk.

15. The storage medium of claim 12, wherein the method further comprises generating alarm information identifying a chart within one of the groups violating the rule.

* * * * *